United States Patent
Weindorf et al.

(10) Patent No.: US 10,927,801 B2
(45) Date of Patent: Feb. 23, 2021

(54) VALVE DEVICE AND FUEL FILTER MODULE

(71) Applicant: MANN+HUMMEL GmbH, Ludwigsburg (DE)

(72) Inventors: Martin Weindorf, Kornwestheim (DE); Rafael Salom, Remseck (DE); Felix Lippert, Dillingen (DE); Ronald Ritzen, Ostfildern (DE); Achim Missner, Winnenden (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 150 days.

(21) Appl. No.: 16/201,785

(22) Filed: Nov. 27, 2018

(65) Prior Publication Data
US 2019/0160403 A1 May 30, 2019

(30) Foreign Application Priority Data

Nov. 29, 2017 (DE) ...................... 10 2017 011 050.6

(51) Int. Cl.
*F02M 37/00* (2006.01)
*B01D 35/157* (2006.01)
(Continued)

(52) U.S. Cl.
CPC ........ *F02M 37/0035* (2013.01); *B01D 35/005* (2013.01); *B01D 35/1573* (2013.01);
(Continued)

(58) Field of Classification Search
CPC ......... Y10T 137/1963; Y10T 137/7737; F16K 31/002; F16K 11/0716; F02M 37/0052;
(Continued)

(56) References Cited

U.S. PATENT DOCUMENTS 4,574,762 A * 3/1986 Muller ................... F02M 31/16
123/510
5,832,902 A * 11/1998 Davis .................... F02D 33/006
123/514
(Continued)

FOREIGN PATENT DOCUMENTS

DE 102005062592 A1 6/2007
DE 112013001855 T5 12/2014
(Continued)

*Primary Examiner* — Atif H Chaudry
(74) *Attorney, Agent, or Firm* — James Hasselbeck (57) ABSTRACT

A valve device for a fuel filter module has a first fluid channel through which fuel flows only in recirculation mode of the fuel filter module and a second fluid channel through which fuel flows only outside of the recirculation mode. The first fluid channel extends inside the second fluid channel. The first and second fluid channels are coaxial to each other. A fuel filter module switchable into recirculation mode and out of recirculation mode is provided with a control valve that has a valve bore and a valve device arranged in the valve bore, wherein the valve device has a first fluid channel through which fuel flows only in recirculation mode and a second fluid channel through which fuel flows only outside of the recirculation mode. The first fluid channel extends inside the second fluid channel, and the first and second fluid channels are coaxial to each other.

20 Claims, 9 Drawing Sheets (51) Int. Cl.
  *F02M 37/32* (2019.01)
  *F16K 31/00* (2006.01)
  *B01D 35/00* (2006.01)
  *F02M 37/44* (2019.01)
  *F02M 37/30* (2019.01)
  *F02M 37/22* (2019.01)
  *F02D 41/06* (2006.01)
  *B60K 15/03* (2006.01)
  *F16K 15/00* (2006.01)

(52) U.S. Cl.
  CPC ....... *F02D 41/064* (2013.01); *F02M 37/0023* (2013.01); *F02M 37/22* (2013.01); *F02M 37/30* (2019.01); *F02M 37/32* (2019.01); *F02M 37/44* (2019.01); *F16K 31/002* (2013.01); *B01D 2201/165* (2013.01); *B01D 2201/206* (2013.01); *B60K 15/03* (2013.01); *B60K 2015/03236* (2013.01); *F16K 15/00* (2013.01); *Y10T 137/1963* (2015.04); *Y10T 137/7737* (2015.04)

(58) Field of Classification Search
  CPC .... F02M 37/0035; F02M 37/22; F02M 37/44; F02D 41/064; B01D 35/005; B01D 35/1573
  See application file for complete search history.

(56) References Cited

U.S. PATENT DOCUMENTS

| | | | |
|---|---|---|---|
| 6,289,879 B1* | 9/2001 | Clausen | F02M 37/0052 123/516 |
| 9,157,634 B2* | 10/2015 | Mencel | F24H 1/06 |
| 9,163,596 B2* | 10/2015 | Fisher | F02M 37/0052 |
| 2013/0160873 A1* | 6/2013 | Stegmaier | F04B 49/002 137/505 |

FOREIGN PATENT DOCUMENTS

| | | |
|---|---|---|
| EP | 1843036 B1 | 10/2007 |
| EP | 2313639 A1 | 2/2010 |

* cited by examiner

VALVE DEVICE AND FUEL FILTER MODULE

BACKGROUND OF THE INVENTION

The present invention concerns a valve device for a fuel filter module and a fuel filter module with such a valve device.

A motor vehicle, for example, a truck, comprises in most cases an internal combustion engine, for example, a diesel engine. The internal combustion engine may have correlated therewith an injection system circuit, in particular a diesel injection system circuit. The injection system circuit may comprise a tank, an injection system, and a fuel filter module for filtering fuel, for example, diesel fuel. The fuel filter module is arranged in this context between the tank and the injection system. In addition to a strainer filter, the fuel filter module may comprise also a fine filter. In particular when using diesel fuel at low temperatures, in particular in case of cold start of the internal combustion engine, paraffins may precipitate and clog the fine filter. Therefore, it may be required to preheat the diesel fuel in order to dissolve these paraffins. For preheating the diesel fuel, heated fuel return flows from the injection system may be supplied to the fine filter and/or strainer filter. This use of heated fuel return flows is referred to as recirculation.

U.S. Pat. No. 6,289,879 B1, EP 1 843 036 B1, and U.S. Pat. No. 9,163,596 B2 each describe recirculation circuits or valves for such recirculation circuits.

Further valve devices for fuel filter modules that are configured for temperature-dependent control of a recirculation circuit are disclosed in DE 11 2013 001 855 T5 and DE 10 2005 062 592 A1.

SUMMARY OF THE INVENTION

It is therefore object of the invention to provide an improved valve device for a fuel filter module.

Accordingly, a valve device for a fuel filter module is proposed. The valve device comprises a first fluid channel, through which fuel can flow only when the fuel filter module is in recirculation mode, and a second fluid channel through which fuel can flow only outside of the recirculation mode, wherein the first fluid channel extends inside the second fluid channel and wherein the first fluid channel and the second fluid channel are arranged coaxially.

Since the first fluid channel extends inside the second fluid channel and the first fluid channel and the second fluid channel are arranged coaxially relative to each other, a particularly compact and constructively simple configuration of the valve device can be achieved. In particular, the valve device can thus be designed with a diameter as small as possible. This can advantageously also reduce the size that the fuel filter module requires.

Preferably, the valve device is arranged within a valve bore. The valve bore can be provided in a housing of the fuel filter module or in a valve housing which is embodied separate from this housing. Preferably, the valve device is constructed rotationally symmetrical, or at least substantially rotationally symmetrical, relative to a center axis or symmetry axis. The valve bore can also be rotationally symmetrical relative to the center axis. AOutside@ of the recirculation mode is to be understood such that the fuel filter module is not in recirculation mode. The first fluid channel extending Ainside@ the second fluid channel is to be understood in particular such that the second fluid channel circumferentially completely encloses or surrounds the first fluid channel. In particular, the second fluid channel in cross section is annular and can thus surround the first fluid channel annularly. The first fluid channel and the second fluid channel arranged Acoaxially@ to each other is to be understood in particular that the first fluid channel and the second fluid channel comprise a common or coinciding rotation axis, i.e., the aforementioned symmetry axis. In particular, the first fluid channel as well as the second fluid channel are constructed rotationally symmetrical relative to the symmetry axis.

When the fuel filter module is in recirculation mode, a volume flow of heated fuel return flows passes preferably in a first flow direction through the first fluid channel. When the fuel filter module is not in recirculation mode, in particular outside of recirculation mode, the volume flow of the heated fuel return flows preferably flows in a second flow direction through the second fluid channel. The second flow direction is preferably oriented opposite to the first flow direction in this context. The flow directions can be oriented moreover parallel to the symmetry axis. The heated fuel return flows are supplied to the fuel filter module, for example, by an injection system of an injection system circuit. The injection system and the fuel filter module are preferably part of the injection system circuit.

In embodiments, the valve device comprises moreover a valve body through with which the first fluid channel and the second fluid channel extend. The valve body can be of a one-part or a multi-part configuration. The valve body can be manufactured from a plastic material and/or a metal material. The valve body is preferably constructed rotationally symmetrical to the symmetry axis.

In embodiments, the valve body comprises a first valve body element and a second valve body element, wherein the first valve body element is connected with form fit to the second valve body element. The second valve body element can comprise for this purpose, for example, snap hooks that are designed to lock at or snap into corresponding cutouts at the first valve body element. A form-fit connection is produced by mutual engagement or engagement from behind of at least two connecting partners, in this case the snap hooks and cutouts. Preferably, the valve body elements are embodied as injection molded plastic components.

In embodiments, the valve body comprises a siphon pipe through which the first fluid channel extends and a tubular sealing section extending about the siphon pipe wherein the second fluid channel is provided between the siphon pipe and the sealing section. In particular, the second fluid channel in cross section is annular and extends thus annularly completely around the first fluid channel. Preferably, the first fluid channel is a bore which is centrally arranged in the siphon pipe and penetrates it completely. The sealing section can be connected by means of webs in a one-piece configuration, in particular monolithic, with the siphon pipe.

In embodiments, the siphon pipe extends in a longitudinal direction of the valve device past the sealing section. The longitudinal direction is arranged parallel to the symmetry axis or coincides therewith. Preferably, the siphon pipe is provided with a circumferentially extending slant at an end facing away from the sealing section.

In embodiments, the valve device comprises moreover a sealing element provided at the sealing section, in particular an O-ring. By means of the sealing element, the valve device can be sealed circumferentially relative to the valve bore.

In embodiments, the valve device comprises moreover a pressure-controlled valve, in particular a check valve, that is configured to open the first fluid channel in the recirculation mode and, outside of the recirculation mode, to fluid-tightly close off the first fluid channel. In an initial state, the valve is preferably closed and can be opened against a spring force of a spring element of the valve. At the first fluid channel, preferably a valve seat of the valve is provided. By means of the spring element, for example, with the aid of a geometry thereof or a spring stiffness thereof, the pressure sensitivity of the valve can be adjusted.

In embodiments, the valve is configured to open when in the first fluid channel a pressure of 350 ∀ 50 mbar exists. The pressure is in particular a differential pressure between a pressure existing in the fluid channel and a pressure behind the valve, i.e., downstream of the valve.

In embodiments, a valve body of the valve, the first fluid channel, and the second fluid channel are arranged coaxially. The valve body is in particular rotationally symmetrical relative to the symmetry axis. The valve body can be manufactured of a metal material or plastic material. The valve body is preferably mushroom-shaped in section and comprises a pin-shaped shaft which is slidably received in a bore provided in the first valve body element and a plate-shaped head provided at the front side at the shaft. A diameter of the head is in particular greater than a diameter of the aforementioned bore. At the head, a sealing element can be provided that faces the second valve body element and is preferably made of an elastically deformable plastic material. By means of the spring element, the valve body is pretensioned against the valve seat in order to close off the first fluid channel.

Moreover, a fuel filter module is proposed that can be switched to recirculation mode and can be switched out of it again. The fuel filter module comprises a control valve that comprises at least one such valve device and a valve bore in which the valve device is accommodated.

The fuel filter module is preferably part of an injection system circuit of a vehicle. The injection system circuit is in particular a diesel injection system circuit of a diesel engine. The fuel filter module is suitable for use in vehicles, in particular in the motor vehicles. For example, the fuel filter module can be used in trucks, agriculturally used vehicles, construction machinery, buses, construction vehicles or even rail vehicles. Moreover, the fuel filter module can also be used in passenger cars or immobile applications, for example, in generators.

The valve bore is preferably provided in a housing of the fuel filter module. The valve bore is configured rotationally symmetrical relative to the symmetry axis. Preferably, the valve bore comprises no constant diameter across its entire length but a stepped geometry. The housing can be of a multi-part configuration and can be made of a plastic material and/or metal material. In the housing, preferably a strainer filter and a fine filter are accommodated. Moreover, the fuel filter module comprises a hand pump in order to fill the strainer filter with fuel, as needed; preferably, in addition to the strainer filter, the fine filter is also filled by means of the hand pump. In the housing, a recirculation path is provided by means of which heated fuel return flows can be supplied to the strainer filter. The recirculation path comprises in this context at least in sections the valve bore and the first fluid channel. The valve of the valve device prevents reliably the intake of air from the recirculation path since it opens only once a pressure of 350 ∀ 50 mbar is reached. In interaction with the siphon pipe of the valve body, the intake of air can be prevented particularly effectively.

In embodiments, the control valve comprises a temperature-controlled actuating element that is accommodated at least in sections or partially in the valve bore, in particular a wax motor, for linear displacement of the valve device in the valve bore and a spring element that is accommodated at least in sections or partially in the valve bore and is configured to spring-pretension the valve device against the actuating element. The spring element is preferably a pressure spring, in particular a cylinder spring. The actuating element being Atemperature-controlled@ is to be understood such that the actuating element by a temperature change alone is automatically capable of extending a plunger and returning it again. An external current supply is not required. Since the actuating element is arranged at least in sections or partially in the valve bore, the actuating element can be cooled or heated by the fuel flowing through the valve bore. Preferably, grooves or channels are provided that enable an optimized flow about a housing of the actuating element. In this way, heat transfer is improved. The actuating element can also be referred to as actor or actuator. The actuating element can also be a bimetal actor, aside from a wax motor.

In embodiments, the actuating element is configured to displace the valve device linearly along the valve bore from an initial position, in which the fuel filter module is in recirculation mode, through a discretionary number of intermediate positions, in which the fuel filter module is outside of the recirculation mode, into an end position in which the fuel filter module is also outside of the recirculation mode.

As mentioned before, the actuating element can move the plunger out of the housing when a temperature increase occurs and in this way linearly displace the valve device or the valve body against the spring force of the spring element. In reverse, the plunger returns again into the housing when the temperature is reduced. The plunger is preferably completely retracted in the initial position, and the plunger is preferably completely extended in the end position.

In embodiments, the valve device comprises a siphon pipe through which the first fluid channel passes, wherein the siphon pipe at least in the end position dips into a closure element which closes off the valve bore in order to fluid-tightly close off the first fluid channel. In this way, opening of the valve can be prevented under all system conditions. The dipping action of the siphon pipe is facilitated by the previously mentioned slant thereof. The closure element is preferably a closure screw. Centrally at the closure element a bore or recess is provided into which the siphon pipe can dip. For circumferential sealing of the siphon pipe, a sealing element is provided in the recess, in particular, an O-ring. The siphon pipe can even dip at least partially into the recess already in the intermediate positions. This dipping action of the siphon pipe into the recess of the closure element is in particular required when at the suction side frame-associated pre-filters are used. In this case, the intake pressure can be greater than 350 mbar and could thus open the valve since accumulation and thus an excess pressure of the heated fuel return flows would not be required. In this case, a recirculation of the heated fuel return flows is to be prevented so that the temperature of the fuel in the injection system does not rise farther.

In embodiments, the valve device comprises a sealing section that is configured to close off in recirculation mode an opening that opens into the valve bore and is in fluid connection with an outlet of the fuel filter module in order to accumulate heated fuel return flows in the valve bore until a pressure-controlled valve of the valve device opens for opening the first fluid channel. The outlet is in particular in fluid communication with the tank. By closing the opening by means of the sealing section, it is prevented that the heated fuel return flows can return directly into the tank. The opening can also be referred to as valve seat of the sealing section or of the control valve. Adjacent to the opening, a return path opens also into the valve bore. Through the return path, the heated fuel return flows are supplied to the valve bore. The return path is positioned below the opening in the direction of the force of gravity. Since the opening is arranged above the return path in the direction of the force of gravity, a siphon arrangement is provided by interaction with the siphon pipe. In this way, a certain quantity of fuel remains always in the housing or in the valve bore. In this way, it can be reliably prevented that air is sucked in and circulates in the injection system circuit upon recirculation of the heated fuel return flows.

In embodiments, the valve device comprises a sealing element which is provided at the sealing section, in particular an O-ring, wherein the valve bore comprises a widened portion with a circumferentially extending slant and wherein the slant is configured to prevent damage of the sealing element upon displacement of the sealing element into the widened portion and out of the widened portion. Since the slant and no shoulder is provided, damage of the sealing element can be reliably prevented. The sealing element can glide easily across the slant. An angle of the slant can be adjusted at will in order to optimize gliding of the sealing element across the slant. The closure element is preferably screwed into the widened portion.

BRIEF DESCRIPTION OF THE DRAWINGS

In the Figures, same or functionally the same elements are provided with the same reference characters, in case nothing to the contrary is indicated.

DESCRIPTION OF PREFERRED EMBODIMENTS

Figure 1:
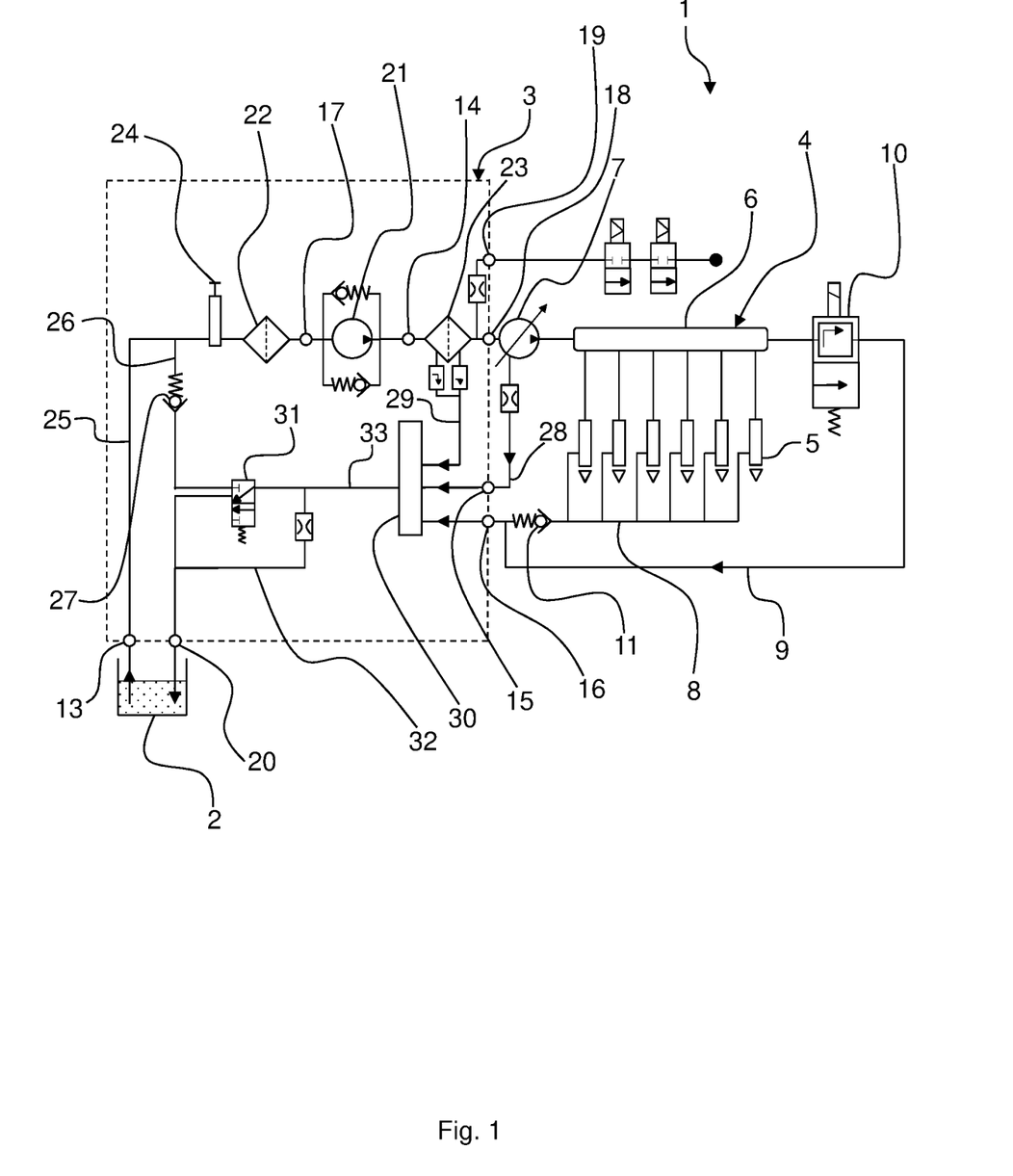
FIG. 1 shows a schematic view of an embodiment of an injection system circuit of an internal combustion engine.

FIG. 1 shows a schematic view of an injection system circuit 1 for an internal combustion engine. The internal combustion engine can be referred to also as combustion motor. In particular, the internal combustion engine is a diesel motor. The injection system circuit 1 is in particular a diesel injection system circuit of a diesel motor. The injection system circuit 1 is suitable for use in vehicles, in particular in motor vehicles. For example, the injection system circuit 1 can be employed in trucks, agriculturally used vehicles, construction machines, buses, construction vehicles but also rail vehicles. Moreover, the injection system circuit 1 can also be used in passenger cars or immobile applications, for example, in generators.

The injection system circuit 1 comprises a tank 2 for receiving fuel, in particular, diesel fuel. Furthermore, a fuel filter module 3 and an injection system 4, arranged behind the fuel filter module 3 or arranged downstream relative thereto, are associated with the injection system circuit 1. This means that the fuel filter module 3 is arranged between the tank 2 and the injection system 4.

The injection system 4 comprises a plurality of injection valves or injection nozzles 5 of which only one is identified with reference character in FIG. 1. The injection nozzles 5 are in fluid communication with a common distribution pipe 6 (common rail) and are supplied by the latter with fuel. For pressure loading of the distribution pipe 6, a high-pressure pump 7 is arranged upstream thereof. All injection nozzles 5 are connected to a common return line 8 through which the fuel can be supplied again to the fuel filter module 3. Moreover, the injection system 4 comprises a bypass line 9 in order to bypass the injection nozzles 5. The bypass line 9 opens also into the return line 8. The bypass line 9 is connected to the distribution pipe 6 and can be opened or blocked by means of a control valve 10. The return flow of the fuel from the bypass line 9 in the direction of the injection nozzles 5 is prevented by means of a check valve 11 arranged in the return line 8.

Figure 2:
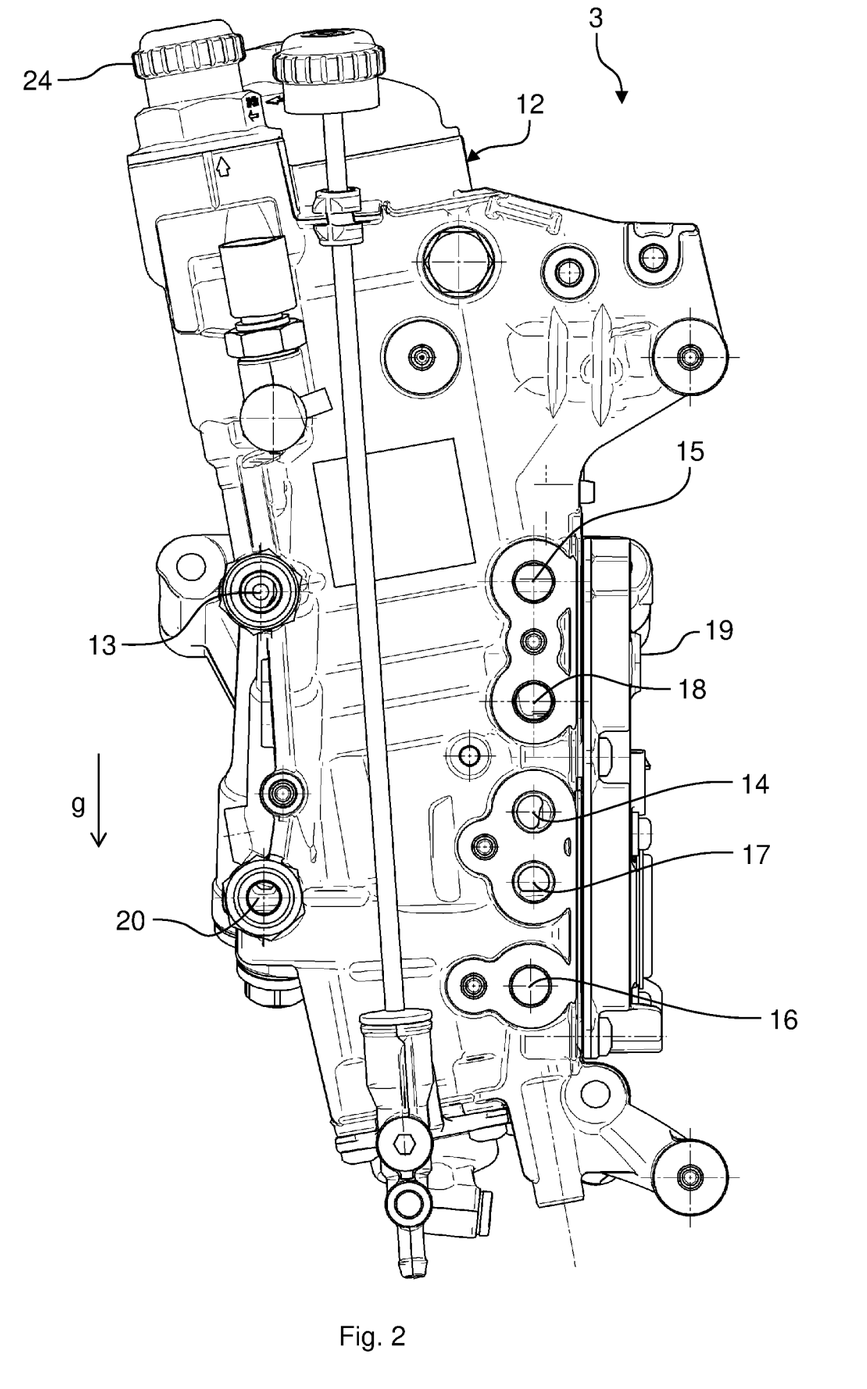
FIG. 2 shows a schematic view of an embodiment of a fuel filter module for the injection system circuit according to FIG. 1.
Figure 3:
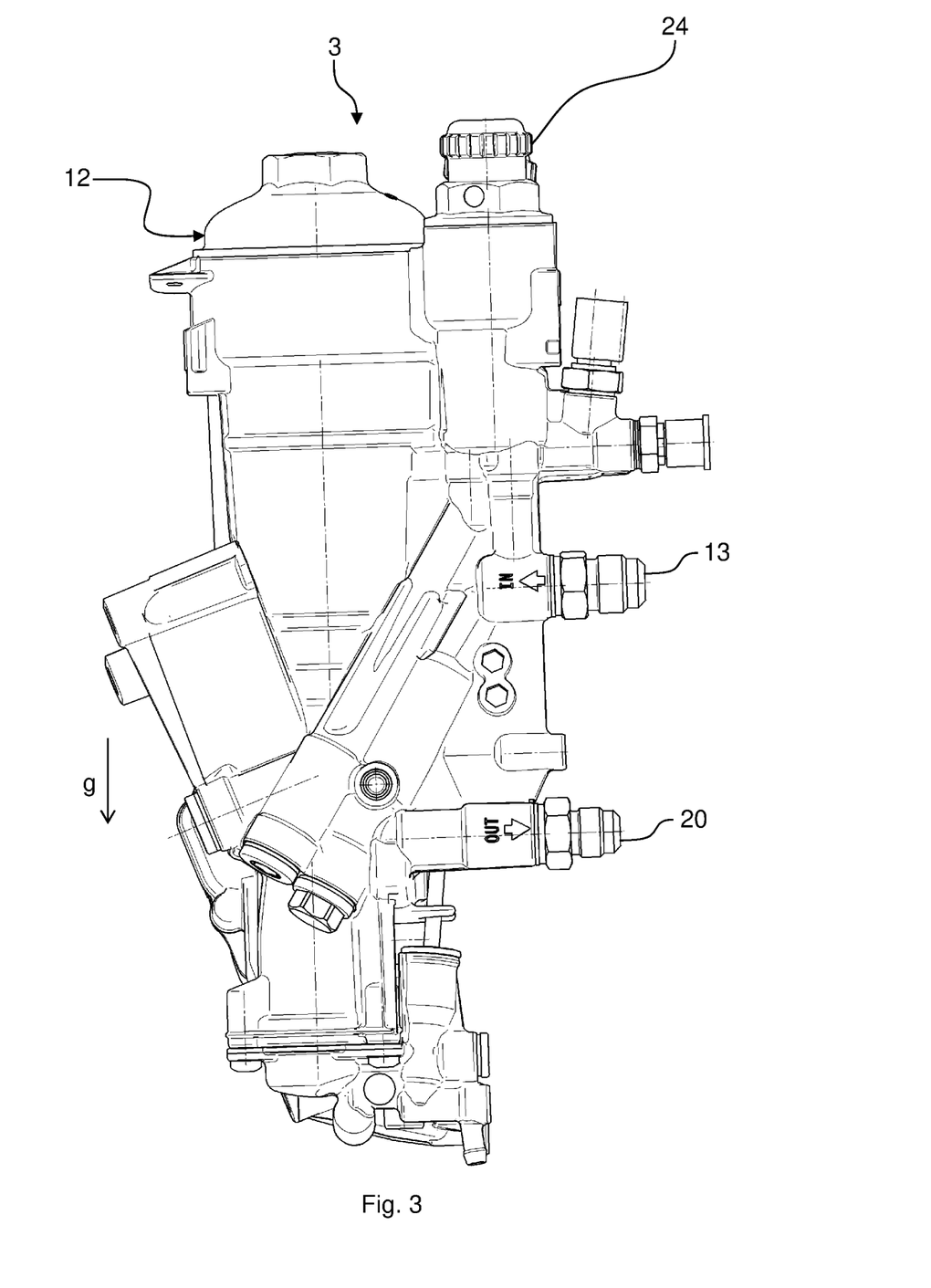
FIG. 3 shows a further schematic view of the fuel filter module according to FIG. 2.

The fuel filter module 3 comprises a housing 12 (FIGS. 2 and 3). The housing 12 can be embodied of a multi-part configuration. For example, the housing 12 is manufactured of a metal material, for example, an aluminum alloy or a magnesium alloy, or is manufactured of plastic material. The housing 12 can also be manufactured partially of a metal material and partially of a plastic material.

The housing 12 comprises a first inlet 13 to which the tank 2 is connected. Through the first inlet 13, fresh fuel is supplied to the fuel filter module 3. The housing 12 comprises also a second inlet 14, a third inlet 15, as well as a fourth inlet 16. Moreover, a first outlet 17, a second outlet 18, a third outlet 19 as well as a fourth outlet 28 are provided at the housing 12. The inlets 13 to 16 can also be referred to as intakes or feeds. The outlets 17 to 20 can also be referred to as discharges or returns. The inlets 13 to 16 and the outlets 17 to 20 can be formed as bores or channels in the housing 12. A force of gravity direction g is oriented from top to bottom in the orientation of FIGS. 2 and 3.

A low-pressure pump 21 is connected between the first outlet 17 and the second outlet 14. The low-pressure pump 21 is preferably arranged outside of the housing 12 and is preferably not part of the fuel filter module 3. In a flow direction of the fuel a strainer filter 22 is arranged upstream of the first outlet 17. A fine filter 23 is arranged downstream of the second inlet 14. This means that the low-pressure pump 21 is arranged between the first outlet 17 and the second inlet 14. The strainer filter 22 and the fine filter 23 are arranged inside the housing 12.

A hand pump 24 accommodated in the housing 12 is provided between the first inlet 13, which is in fluid communication with the tank 2, and the strainer filter 22. Parallel to a feed 25 which is arranged between the first inlet 13 and the hand pump 24, a recirculation path 26 is provided which opens upstream of the hand pump 24 into the feed 25. The recirculation path 26 comprises a valve 27. The valve 27 is a check valve. The valve 27 is configured to prevent that air from the inlets 15, 16 is sucked in instead of fuel from the first inlet 13 when actuating the hand pump 24. The valve 27 is thus arranged between the first inlet 13 and the inlets 15, 16. The valve 27 is configured to open at an excess pressure of 350 ∀ 50 mbar.

A return 28 of the high-pressure pump 7 is connected to the third inlet 15. The high-pressure pump 7 itself is connected to the second outlet 18. The third inlet 15, the fourth inlet 16, and a return 29 of the fine filter 23 are in fluid communication with a common collector 30 (fuel gallery). The collector 30, in turn, is in fluid communication with the recirculation path 26 by means of the control valve 31. The control valve 31 can be switched such that fuel from the collector 30 is supplied either to the valve 27 or to the fourth outlet 20 and thus to the tank 2. A leakage path 32 bypassing the control valve 31 can extend to the fourth outlet 20. For this purpose, the leakage path 32 branches off upstream of the control valve 31 from a return path 33 provided between the collector 30 and the control valve 31.

The functionality of the injection system circuit 1 or of the fuel filter module 3 will be explained in the following with the aid of FIGS. 4 to 9 that each show a schematic partial section view of the fuel filter module 3. In this context, FIGS. 4 and 5 show the fuel filter module 3 at a fuel temperature of approximately −5° C. or less, FIG. 6 at a fuel temperature of +5° C., FIG. 7 at a fuel temperature of +30° C., FIG. 8 at a fuel temperature of +60° C., and FIG. 9 at a fuel temperature of +100° C.

When using diesel fuel, paraffins precipitating from the latter can clog the strainer filter 22 and/or the fine filter 23 at low environmental temperature and thus also at low fuel temperature. Therefore, by means of the recirculation path 26 heated fuel can be supplied to the feed 25. For example, the fuel is heated due to friction when flowing through the high-pressure pump 7 and/or the injection nozzles 5 and the corresponding lines and channels.

Moreover, for example, after a filter service, e.g. an exchange of the filter element of the strainer filter 22 or the fine filter 23, it can be necessary to take in fuel from the tank 2 by means of the hand pump 24; this can be the case also when the tank is completely emptied. However, it is undesirable in this context, as mentioned before, to suck in air from the circulation path 26. This is prevented by valve 27. A critical operating state for the injection system circuit 1 is the cold start at idle rpm. In this operating state, the volume flows from the inlets 15, 16 or the return 29 in the direction toward the control valve 31 are very small so that the pressure is not sufficient to open valve 27. Therefore, the fuel must first be accumulated until the aforementioned differential pressure of 350 ∀ 50 mbar across the valve 27 can be overcome. This accumulation can be achieved by means of the control valve 31.

Figure 4:
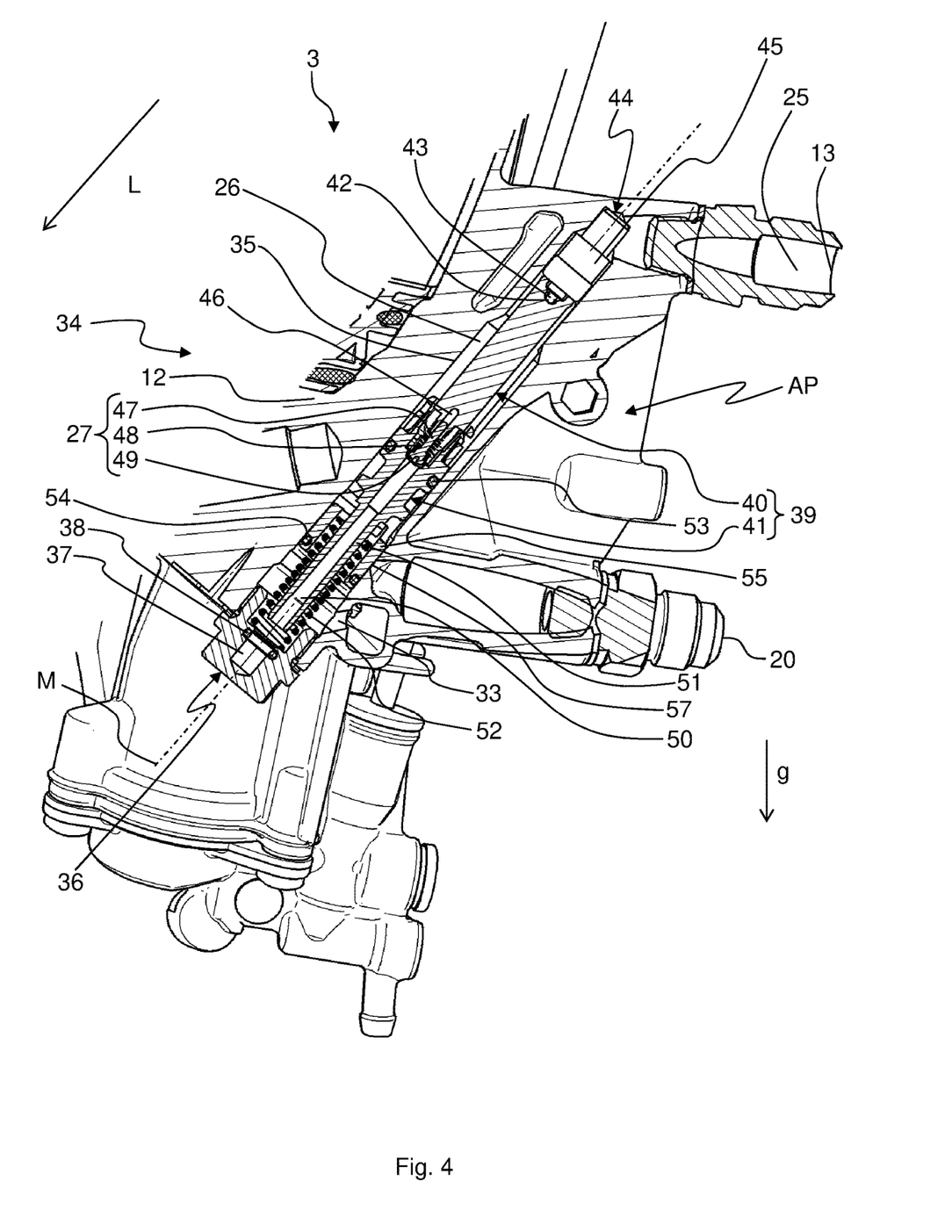
FIG. 4 shows a schematic partial section view of the fuel filter module according to FIG. 2.
Figure 5:
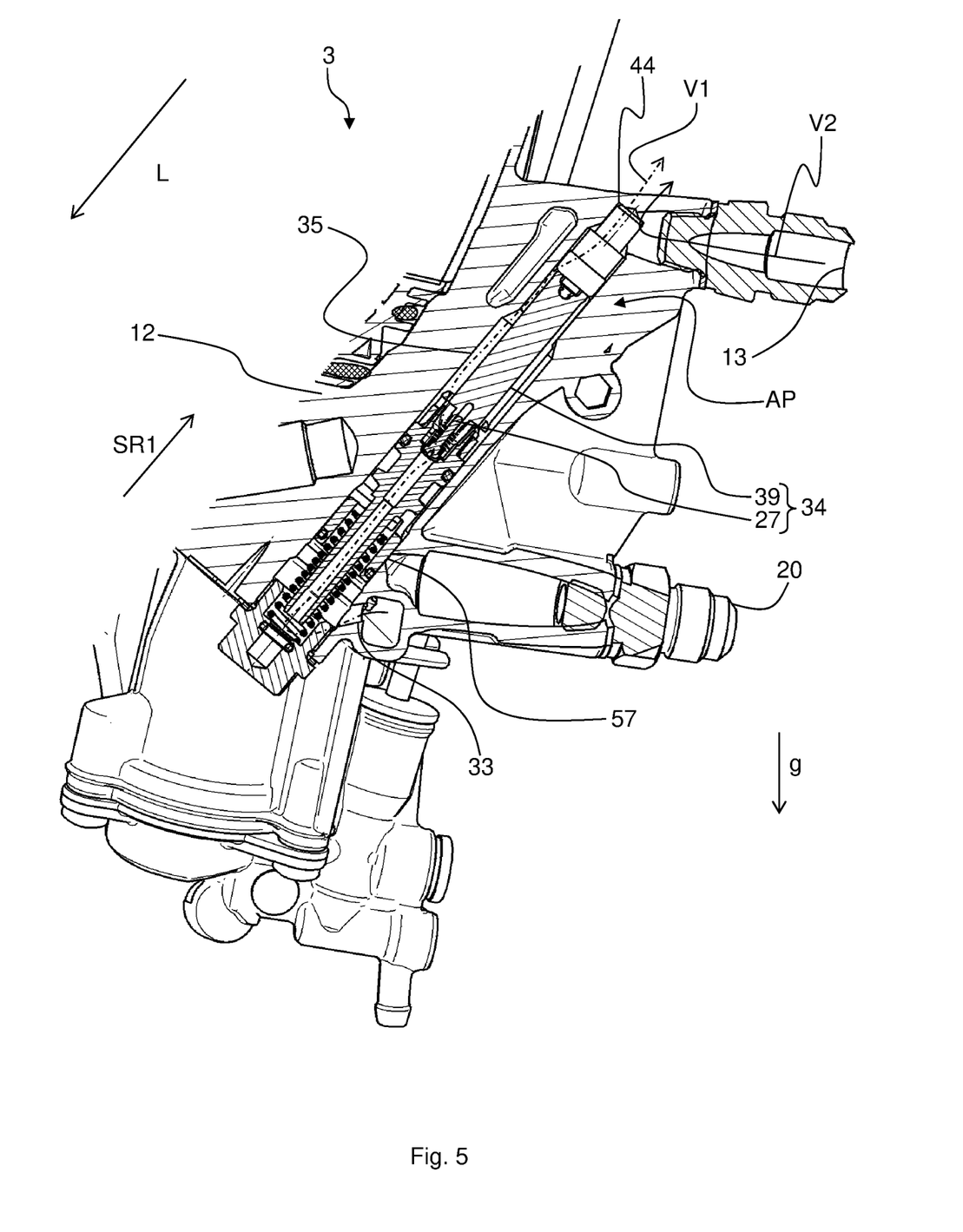
FIG. 5 shows a further schematic partial section view of the fuel filter module according to FIG. 2.

As shown, for example, in FIG. 4, the control valve 31 comprises a valve device 34 which is received in a valve bore 35. The valve bore 35 is provided in the housing 12. However, the valve bore 35 can also be provided in a separate valve housing, not illustrated. The valve bore 35 is part of the control valve 31. The valve bore 35 comprises preferably no constant diameter across its entire length but a stepped geometry with several different diameters. The valve bore 35 is rotationally symmetrical relative to a center axis or symmetry axis M. The recirculation path 26 can extend at least partially through the valve bore 35. This means that the recirculation path 26 may comprise the valve bore 35.

In the orientation according to FIGS. 4 to 9, the valve bore 35 is downwardly closed off by a closure element 36, in particular a closure screw, in a fluid-tight manner. The closure element 36 is screwed into the valve bore 35. For this purpose, at the closure element 36 an outer thread and at the valve bore 35 a corresponding inner thread are provided. The closure element 36 comprises centrally a bore, in particular a blind bore, or circular cylindrical recess 37 which is facing the valve bore 35. This means that the recess 37 is accessible only from the valve bore 35. At an end section of the closure element 36 facing the valve bore 35, a sealing element 38 circumferentially extending about the recess 37, in particular an O-ring, is provided. The sealing element 38 can be received in an annular groove in such a way that it is projecting radially slightly into the recess 37.

The valve device 34 comprises a two-part valve body 39 with a first valve body element 40 and a second valve body element 41. Moreover, the valve device 34 comprises the valve 27. The valve body elements 40, 41 are manufactured, for example, as injection molded plastic components. The valve body elements 40, 41 can be connected with form fit to each other. For this purpose, snap hooks can be provided at the second valve body element 41, for example, that engage with form fit cutouts provided at the first valve body element 40. A form-fit connection is produced by mutual engagement or engagement from behind of at least two connecting partners, in this case the snap hooks and cutouts. However, the valve body elements 41 and 40 can also be non-detachably connected to each other or the valve body 39 can be of a one-piece configuration. The valve body 39 can also be referred to as first valve body. The valve body 39 is substantially rotationally symmetrical relative to the symmetry axis M. This means that the symmetry axis M is correlated with the valve bore 35 as well as with the valve body 39 or the valve device 34.

The first valve body element 40 comprises a cup-shaped depression 42 which is facing away from the second valve body element 41. The depression 42 is optional. A plunger 43 of an actuating element 44 of the control valve 31 engages the depression. The actuating element 44 can also be referred to as actor or actuator. The actuating element 44 is configured to linearly extend the plunger 43 at a temperature increase and again retract linearly the plunger 43 at a temperature decrease. For example, the actuating element 44 can be a wax motor or a bimetal actor. The actuating element 44 is arranged inside the valve bore 35.

In this context, the valve bore 35 can be configured such that it comprises a receiving section for receiving a housing 45 of the actuating element 44. Preferably, channels or grooves are provided that extend along the housing 45 or extend around it so that the housing 45 can be cooled or heated by the fuel flowing about.

By means of the actuating element 44, the valve device 34 or the valve body 39 can be linearly displaced in the valve bore 35 in a longitudinal direction L. The longitudinal direction L is arranged parallel to the symmetry axis M or coincides therewith. In this context, the longitudinal direction can extend from the top right to bottom left or vice versa in the orientation of FIGS. 4 to 9.

The first valve body element 40 comprises a bore 46 facing away from the recess 42, i.e., facing the second valve body element 41, in which a further in particular a second valve body 47 is linearly slidable, i.e., slidable along the longitudinal direction L. The bore 46 is provided centrally at the first valve body element 40. The bore 46 is a blind bore. The valve body 47 can be manufactured of a metal material or of a plastic material. The valve body 47 is mushroom-shaped in section view and comprises a pin-shaped shaft which is slidably received in the bore 46 and a plate-shaped head provided at the front side at the shaft. A diameter of the head is greater than a diameter of the bore 46. A sealing element which is facing the second valve body element 41 can be provided at the head and is preferably manufactured of an elastically deformable plastic material.

The valve body 47 is spring-pretensioned by means of a spring element 48, in particular a pressure spring, against the second valve body element 41. In this context, the valve body 47 with the aforementioned sealing element is resting against a valve seat 49 provided at the second valve body element 41. The valve body 47, the spring element 48, and the valve seat 49 are part of the valve 27. As already mentioned before, the valve 27 is part of the valve device 34. Accordingly, the valve 27 can also be part of the control valve 31. The valve 27 is thus arranged also inside the valve device 34 or inside the valve body 39. The spring element 48 is designed such that the valve body 47 is lifted off the valve seat 49 against the spring force of the spring element 48 at a differential pressure of 350 ∀ 50 mbar.

The valve seat 49 is provided at a first fluid channel 50 which penetrates centrally the second valve body element 41. The first fluid channel 50 is a central bore. The first fluid channel 50 passes completely through the second valve body element 41. The first fluid channel 50 is part of the recirculation path 26. The second valve body element 41 comprises a siphon pipe 51 through which the first fluid channel 50 is also extended. The siphon pipe 51 is designed to dip into the recess 37 of the closure element 36. In this context, the siphon pipe 51 can be sealed circumferentially relative to the closure element 36 by means of the sealing element 38.

A spring element 52 of the control valve 31 is threaded onto the siphon pipe 51 and spring-pretensions the valve body 39 in the direction toward the actuating element 44. The spring element 52 is a pressure spring. The spring element 52 is arranged in axial direction, i.e., in longitudinal direction L, between the closure element 36 and a shoulder provided at the second valve body element 41.

At the exterior, the valve body 39 comprises a first sealing element 53, in particular an O-ring, provided at the second valve body element 41 and a second sealing element 54, in particular also an O-ring, that is spaced apart from the first sealing element 53 in the longitudinal direction L. Corresponding circumferentially extending annular grooves for the sealing elements 53, 54 are provided in the second valve body element 41. The second sealing element 54 comprises a larger diameter than the first sealing element 53.

The sealing elements 53, 54 are designed to seal the valve body 39 circumferentially relative to the valve bore 35. The second sealing element 54 is arranged at a tubular sealing section 55 of the second valve body element 41. The siphon pipe 51 extends through the sealing section 55. The sealing section 55 can be connected by means of webs monolithically with the siphon pipe 51. The sealing section 55 is configured to seal the valve body 39 circumferentially relative to the valve bore 35. A diameter of the sealing section 55 is adapted such that only a leakage volume flow can pass through between the sealing section 55 and the valve bore 35. This is indicated in FIG. 1 by means of the leakage path 32.

A second fluid channel 56 (FIG. 6) is provided between the sealing section 55 and the siphon pipe 51. The spring element 52 is received at least partially in the second fluid channel 56. The second fluid channel 56 is constructed, like the first fluid channel 50, rotationally symmetric to the symmetry axis M. The second fluid channel 56 in cross section is annular and extends completely around the first fluid channel 50. The first fluid channel 50 and the second fluid channel 56 are arranged coaxially to each other. This means that the fluid channels 50, 56 have a common symmetry axis M.

The control valve 31 comprises the valve device 34 with the valve body 39 and the sealing elements 53, 54, the valve bore 35 and/or the sealing section 55 as well as the spring element 52 and the actuating element 44. The valve 27 is part of the valve device 34. In particular, the valve 27 can also be part of the control valve 31 or is arranged inside thereof, in particular inside the valve device 34 or the valve body 39.

As mentioned before, FIGS. 4 and 5 show the fuel filter module 3 at a low ambient temperature, for example, at −5° C. This means that the fuel also has a temperature of −5° C. At this temperature, the plunger 43 of the actuating element 44 is completely retracted into the housing 45 so that the valve body 39 is resting against the housing 45. This means that, in the orientation of FIGS. 4 and 5, the spring element 52 pushes the valve body 39 along the longitudinal direction L maximally to the top right. This position of the valve device 34 or of the valve body 39 can be referred to as cold start position or initial position AP. In the initial position AP, a return bore or opening 57 of the fourth outlet 20 that laterally opens into the valve bore 35 is blocked by the sealing section 55 so that the fourth outlet 20 is blocked. The opening 57 can also be referred to as valve seat of the sealing section 55 or of the control valve 31. Heated fuel return flows are thus not supplied to the tank 2 in the initial position AP. Viewed in the direction of the force of gravity g, the opening 57 is positioned above the return path 33.

The first sealing element 53 prevents in the initial position AP that the heated fuel return flows can flow in upward direction laterally past the valve body 39 against the force of gravity direction g. The fuel return flows are instead accumulated in the valve bore 35 and supplied to the valve 27 through the first fluid channel 50 of the siphon pipe 51. As soon as the differential pressure of 350 ∀ 50 mbar is surpassed, the valve body 47 is lifted off the valve seat 49 against the spring force of the spring element 48 so that the valve 27 is opened. The fuel return flows flow now as recirculation volume flow or first volume flow V1 (in FIG. 5 illustrated as a dash dotted line) through the siphon pipe 51 and the valve 27 and laterally past the first valve body element 40 in the direction of the actuating element 44. A first flow direction SR1 of the first volume flow V1 is oriented in this context opposite to the longitudinal direction L.

Thus, a recirculation of the heated fuel return flows is realized. As mentioned before, the housing 45 of the actuating element 44 is heated by the heated fuel return flows. Through the first inlet 13 a second volume flow V2 (in FIG. 5 shown as a solid line) of the fuel is supplied from the tank 2 to the fuel filter module 3 which mixes with the heated fuel return flows. In this way, paraffins which have precipitated in the strainer filter 22 can be dissolved. The fuel filter module 3 is therefore in recirculation mode only when the valve device 34 or the valve body 39 is arranged in the initial position AP.

Figure 6:
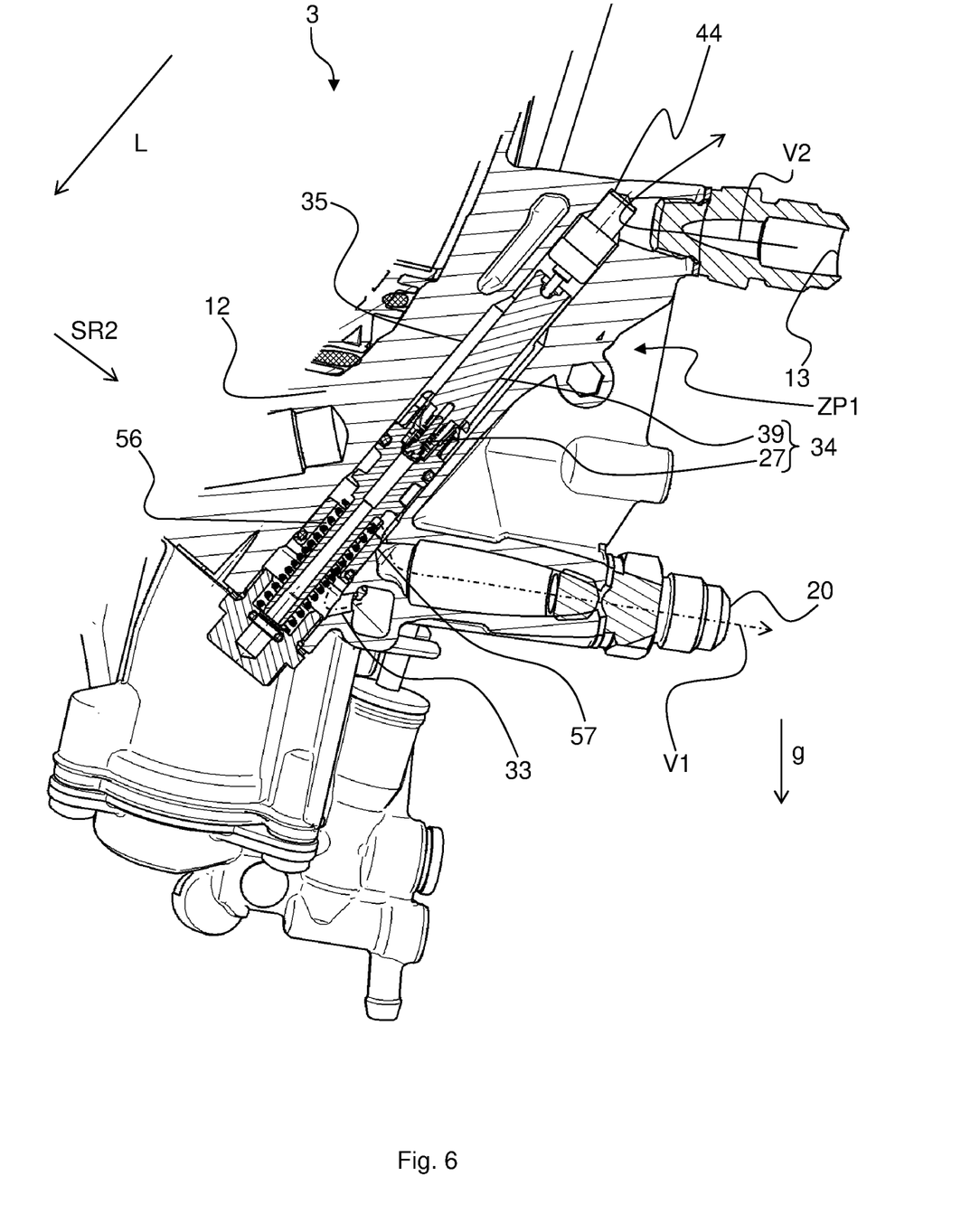
FIG. 6 shows a further schematic partial section view of the fuel filter module according to FIG. 2.

FIG. 6 shows the fuel filter module 3 at an increased temperature. For example, the fuel has a temperature of +5° C. As a result of the increased temperature, the plunger 34 of the actuating element 44 is extended out of the housing 45 such that the valve body 39 in the longitudinal direction L is displaced against the spring force of the spring element 52. The valve device 34 or valve body 39 is in a warm-up phase position or in a first intermediate position ZP1. In the first intermediate position ZP1, the sealing section 55 of the valve body 39 partially opens the opening 57 so that the heated fuel return flows are supplied from the return path 33 to the fourth outlet 20 and thus to the tank 2. In this way, the fuel received in the tank 2 gradually heats up. The pressure upstream of the valve 27 collapses so that the latter closes. This means that no recirculation of heated fuel return flows occurs anymore.

In the first intermediate position ZP1, fuel from the tank 2 is supplied to the fuel filter module 3 through the first inlet 13. The first volume flow V1 of the heated fuel return flows in FIG. 6 flows from the return path 33 at the inner side along the sealing section 55 to the fourth outlet 20 and thus to the tank 2. This means the first volume flow V1 flows in the first intermediate position ZP1 through the second fluid channel 56. A second flow direction SR2 of the first volume flow V1 extends approximately normal to the flow direction SR1; it is caused by a flow deflection between the exit of the first fluid path 50 from the sealing section 55 and entry into the opening/return bore 57. In certain positions of the valve body (e.g. ZP1), it can extend also somewhat against SR1 in the longitudinal direction L, thus opposite to the first flow direction SR1. Moreover, in FIG. 6 the second volume flow V2 is shown which flows from the first inlet 13, i.e., from the tank 2 past the actuating element 44 to the strainer filter 22.

Figure 7:
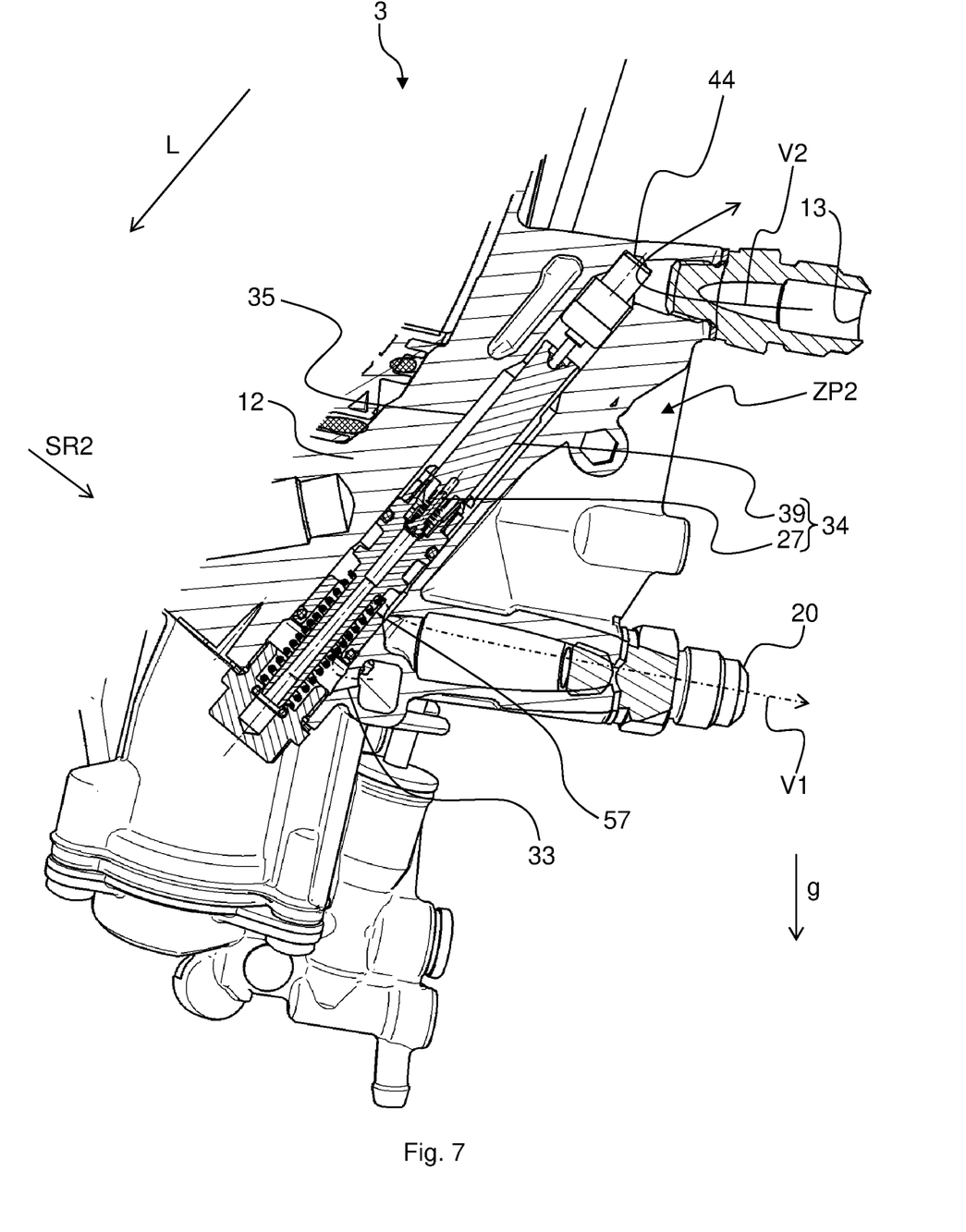
FIG. 7 shows a further schematic partial section view of the fuel filter module according to FIG. 2.

FIG. 7 shows the fuel filter module 3 at a further increased temperature. For example, the fuel here has a temperature of +30° C. The plunger 43 of the actuating element 44, as a result of the increased temperature in comparison to FIG. 6, is extended still farther out of the housing 45 so that the valve body 39 is displaced farther in the direction of the closure element 36 against the spring force of the spring element 52 in the longitudinal direction L. The valve device 34 or the valve body 39 is now in an operating state position or a second intermediate position ZP2. The second intermediate position ZP2 is the normal state of the fuel filter module 3.

The valve 27 in the second intermediate position ZP2 continues to be closed. The heated fuel return flows, as illustrated by means of the first volume flow V1, are supplied through the fourth outlet 20 to the tank 2. In this way, the fuel received in the tank 2 is heated further. Moreover, the second volume flow V2 is shown that flows from the first inlet 13, i.e., the tank 2, past the actuating element 44 to the strainer filter 22. The siphon pipe 51 in the second intermediate position ZP2 has not yet dipped into the recess 37 of the closure element 36. The first volume flow V1 flows in the second intermediate position ZP2 through the second fluid channel 56.

Figure 8:
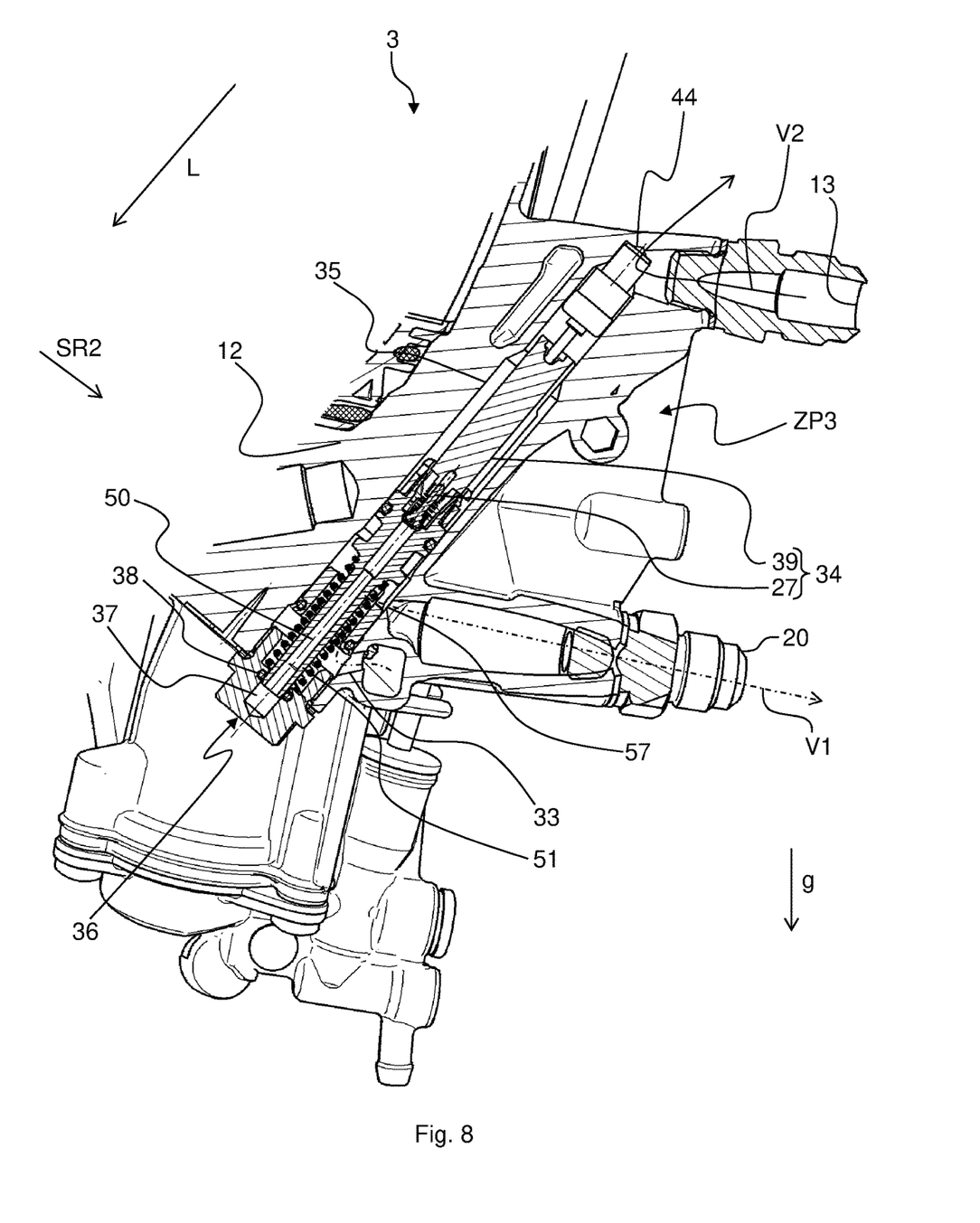
FIG. 8 shows a further schematic partial section view of the fuel filter module according to FIG. 2.

FIG. 8 shows the fuel filter module 3 at a further increased temperature. For example, the fuel here has a temperature of +60° C. The plunger 43 of the actuating element 44, due to the increased temperature in comparison to FIG. 7, is still farther extended out of the housing 45 so that the valve body 39 is displaced farther in the direction of the closure element 36 against the spring force of the spring element 52 in the longitudinal direction L. The valve device 34 or the valve body 39 is now in a third intermediate position ZP3. The third intermediate position ZP3 can be reached, for example, when driving the tank empty at high ambient temperatures.

The opening 57 is completely open in the third intermediate position ZP3 and the valve 27 is closed. The heated fuel return flows, as is shown by means of the first volume flow V1, are supplied through the fourth outlet 20 to the tank 2. In this way, the fuel contained in the tank 2 is further heated. Moreover, the second volume flow V2 is shown which flows from the first inlet 13, i.e., the tank 2, past the actuating element 44 to the strainer filter 22. The first volume flow V1 flows also through the second fluid channel 56 in the third intermediate position ZP3.

In the third intermediate position ZP3, the siphon pipe 51 begins to dip into the recess 37 of the closure element 36. The sealing element 38 seals the siphon pipe 51 circumferentially relative to a cylindrical wall of the recess 37. Since the siphon pipe 51 is sealed relative to the recess 37, no volume flow through the first fluid channel 50 toward the valve 27 is possible. This means that under all system conditions, for example, in case of pressure surges in the return path 33, it is prevented that the valve 27 opens. In this way, a recirculation of the heated fuel return flows is avoided under all system conditions.

This dipping action of the siphon pipe 51 into the recess 37 of the closure element 36 is required in particular since, in case of frame-associated prefilters employed at the suction side, the intake pressure might be greater than 350 mbar and therefore an accumulation and thus an excess pressure of the heated fuel return flows would not be necessary for opening of the valve 27. In this case, a recirculation of the heated fuel return flows is to be prevented so that the temperature of the fuel in the injection system 2 does not rise any farther.

Figure 9:
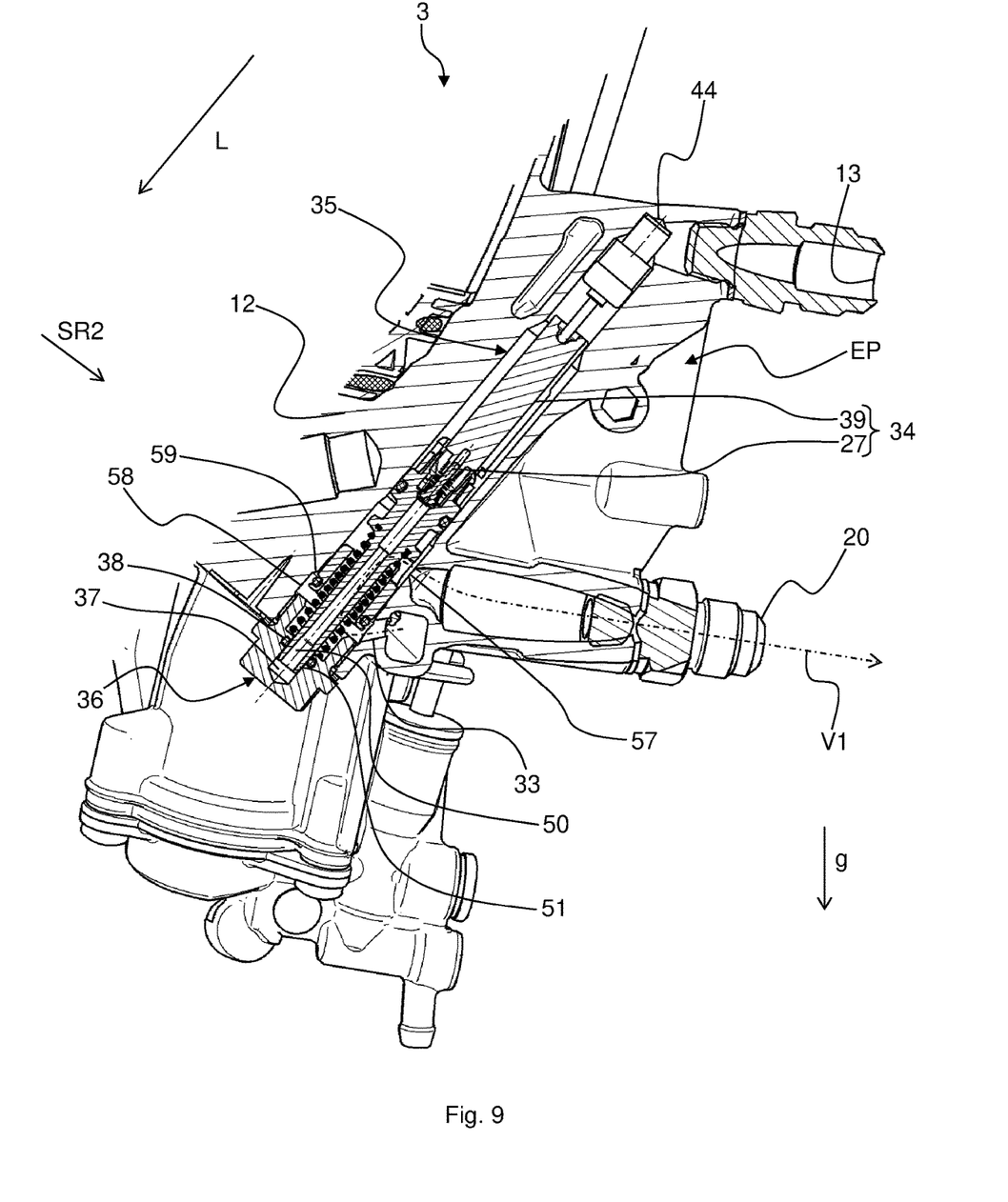
FIG. 9 shows a further schematic partial section view of the fuel filter module according to FIG. 2.

FIG. 9 shows the fuel filter module 3 at a further increased temperature. For example, the fuel has here a temperature of +100° C. The plunger 43 of the actuating element 44, as a result of the increased temperature in comparison to FIG. 8, is extended maximally out of the housing 45 so that the valve body 39 is displaced still farther in the direction toward the closure element 36 against the spring force of the spring element 52 in the longitudinal direction L. The valve device 34 or the valve body 39 is now in an end position EP from where the valve body 39 cannot be moved farther in the direction toward the closure element 36. The end position EP can be reached, for example, at the end of driving the tank empty at high ambient temperatures. The opening 57 in the end position EP is completely open and the valve 27 is closed. The heated fuel return flows, as illustrated by means of the first volume flow V1, is supplied through the fourth outlet 20 to the tank 2. The first volume flow V1 flows through the second fluid channel 56 in the end position EP.

In comparison to the third intermediate position ZP3, the siphon pipe 51 has dipped completely into the recess 37 of the closure element 36. The sealing element 38 seals the siphon pipe 51 circumferentially relative to the cylindrical wall of the recess 37. This means that it is prevented under all system conditions that the valve 27 opens. In this way, under all system conditions a recirculation of the heated fuel return flows is prevented. The number of intermediate positions ZP1 to ZP3 between the starting position AP and the end position EP is discretionary. The intermediate positions ZP1 to ZP3 are selected as examples only. The fuel filter module 3 is thus outside of the recirculation mode, i.e., is not in recirculation mode, when the valve device 34 or the valve body 39 is in one of the intermediate positions ZP1 to ZP3 or in the end position EP.

As illustrated furthermore in FIG. 9, the valve bore 35 has a widened portion 58 facing the closure element 36 into which the closure element 36 is screwed. The widened portion 58 is formed as a cross-sectional enlargement of the valve bore 35. This means that a diameter of the widened portion 58 is enlarged in comparison to the remaining valve bore 35. The diameter of the widened portion 58 is so large that the second sealing element 54, when it is arranged in the widened portion 58, no longer contacts the valve bore 35 circumferentially and thus also does not seal relative to it anymore. At the widened portion 58 a circumferential slant 59 is provided. The slant 59 prevents that the second sealing element 54 is damaged when it is displaced into the widened portion 58 and out of it again upon displacement of the valve device 34 or of the valve body 39.

Since, in the direction of the force of gravity g, the opening 57 is arranged above the return flow path 33 that opens into the valve bore 35, a siphon arrangement results in interaction with the siphon pipe 51. In this way, there always remains a certain quantity of fuel in the housing 12 or in the valve bore 35. In this way, it can be prevented that air is sucked in and circulates in the injection system circuit 1 upon recirculation of the heated fuel return flows.

In summary, the valve arrangement 34 for recirculation of heated fuel return flows is advantageously pressure-controlled by means of the valve 27 as well as temperature-controlled by means of the actuating element 44. Moreover, by means of the valve device 34 or of the valve body 39 in which the valve 27 is integrated, several functions can be fulfilled at the same time. The recirculation can be controlled and the intake of air, when using the hand pump 24, can be reliably prevented. The siphon arrangement with the siphon pipe 51, the opening 57, and the return path 33 prevents that, upon recirculation, air can be sucked in that then circulates in the injection system circuit 1. At high fuel temperatures of above +30° C., due to the dipping action of the siphon pipe 51 into the recess 37 of the closure element 36, no pressure-controlled recirculation is possible anymore. In this way, a further undesirable increase of the temperature of the fuel in the injection system 4 is reliably prevented.

While specific embodiments of the invention have been shown and described in detail to illustrate the inventive principles, it will be understood that the invention may be embodied otherwise without departing from such principles.

LIST OF REFERENCE CHARACTERS

1 injection system circuit
2 tank
3 fuel filter module
4 injection system
5 injection nozzle
6 distribution pipe
7 high-pressure pump
8 return line
9 bypass line
10 control valve
11 check valve
12 housing
13, 14, 15, 16 inlet
17, 18, 19, 20 outlet
21 low-pressure pump
22 strainer filter
23 fine filter
24 hand pump
25 feed
26 recirculation path
27 valve
28, 29 return
30 return collector
31 control valve
32 leakage path
33 return path
34 valve device
35 valve bore
36 closure element
37 recess
38 sealing element
39 valve body
40 first valve body element
41 second valve body element
42 depression of the first valve body element
43 plunger
44 actuating element
45 housing of the actuating element
46 bore of the first valve body element
47 valve body
48 spring element
49 valve seat
50 first fluid channel
51 siphon pipe
52 spring element
53, 54 sealing element
55 sealing section
56 second fluid channel
57 opening/return bore
58 widened portion
59 slant
AP initial position
EP end position
g direction of force of gravity
M symmetry axis
L longitudinal direction
SR1 flow direction
SR2 flow direction
V1 volume flow
V2 volume flow
ZP1 intermediate position
ZP2 intermediate position
ZP3 intermediate position

What is claimed is:

1. A valve device for a fuel filter module, the valve device comprising:
    a first fluid channel through which fuel flows only in a recirculation mode of the fuel filter module;
    a second fluid channel through which fuel flows only outside of the recirculation mode of the fuel filter module;
    wherein the first fluid channel extends inside the second fluid channel;
    wherein the first fluid channel and the second fluid channel are arranged coaxially to each other;
    wherein the valve device further comprises
        a pressure-controlled valve configured to open the first fluid channel in the recirculation mode of the fuel filter module and to close off fluid-tightly the first fluid channel outside of the recirculation mode of the fuel filter module;
    wherein a valve body of the pressure-controlled valve, the first fluid channel, and the second fluid channel are arranged coaxially to each other.

2. The valve device according to claim 1, further comprising
    a valve body,
    wherein the first fluid channel and the second fluid channel extend at least partially through the valve body.

3. The valve device according to claim 2, wherein
    the first fluid channel and the second fluid channel extend through the valve body in a longitudinal direction of the valve device.

4. The valve device according to claim 2, wherein
    the valve body comprises
        a first valve body element and
        a second valve body element,
        wherein the first valve body element is connected to the second valve body element.

5. The valve device according to claim 4, wherein
    the first valve body element and the second valve body element are connected with form fit to each other.

6. The valve device according to claim 4, wherein
the first valve body element and the second valve body element adjoin each other in the longitudinal direction.

7. The valve device according to claim 4, wherein
the valve body comprises
a siphon pipe through which the first fluid channel extends,
wherein the valve body further comprises
a tubular sealing section extending about the siphon pipe,
wherein the second fluid channel is provided radially between the siphon pipe and the tubular sealing section.

8. The valve device according to claim 7, wherein the siphon pipe is a part of the second valve body element and wherein the second fluid channel, the siphon pipe, and the tubular sealing section are arranged coaxially to each other.

9. The valve device according to claim 7, wherein
the siphon pipe extends in the longitudinal direction of the valve device past the tubular sealing section.

10. The valve device according to claim 7, further comprising
a sealing element arranged at the tubular sealing section.

11. The valve device according to claim 10, wherein
the sealing element is an O-ring.

12. The valve device according to claim 1, wherein
the pressure-controlled valve is a check valve.

13. The valve device according to claim 1, wherein the pressure-controlled valve opens when a pressure of 350 ∀ 50 mbar is present in the first fluid channel.

14. A fuel filter module configured to be switched into a recirculation mode and out of the recirculation mode, the fuel filter module comprising
a control valve comprising
a valve bore and
at least one valve device arranged in the valve bore, wherein the at least one valve device comprises:
a first fluid channel through which fuel flows only in the recirculation mode of the fuel filter module;
a second fluid channel through which fuel flows only outside of the recirculation mode of the fuel filter module;
wherein the first fluid channel extends inside the second fluid channel; and
wherein the first fluid channel and the second fluid channel are arranged coaxially to each other;
wherein the control valve further comprises:
a temperature-controlled actuating element received at least partially in the valve bore and configured to linearly displace the at least one valve device in the valve bore, and
a spring element received at least partially in the valve bore and configured to spring-pretension the at least one valve device against the temperature-controlled actuating element.

15. The fuel filter module according to claim 14, wherein the temperature-controlled actuating element is a wax motor.

16. The fuel filter module according to claim 14, wherein the temperature-controlled actuating element is configured to move the at least one valve device linearly along the valve bore from an initial position, in which the fuel filter module is in the recirculation mode, through a plurality of intermediate positions into an end position, wherein the fuel filter module is outside of the recirculation mode in the plurality of intermediate positions and in the end position.

17. The fuel filter module according to claim 16, wherein the at least one valve device comprises
a siphon pipe through which the first fluid channel extends,
wherein the at least one valve device further comprises
a closure element,
wherein the closure element closes off the valve bore,
wherein the siphon pipe, at least in the end position, dips into the closure element to fluid-tightly close off the first fluid channel.

18. The fuel filter module according to claim 14, further comprising
an outlet and an opening,
wherein the opening opens into the valve bore and is in fluid communication with the outlet,
wherein the at least one valve device comprises a sealing section configured to close off in the recirculation mode the opening to accumulate heated fuel return flows in the valve bore until a pressure-controlled valve of the at least one valve device opens to open the first fluid channel.

19. The fuel filter module according to claim 18, wherein the at least one valve device comprises
a sealing element arranged at the sealing section,
wherein the valve bore comprises
a widened portion with a circumferentially extending slant, and
wherein the slant is configured to prevent damage of the sealing element when the sealing element is displaced into the widened portion and out of the widened portion.

20. The fuel filter module according to claim 19, wherein the sealing element is an O-ring.

* * * * *